US010003241B2

United States Patent
Naito et al.

(10) Patent No.: US 10,003,241 B2
(45) Date of Patent: Jun. 19, 2018

(54) VEHICLE INVERTER DEVICE AND MOTOR-DRIVEN COMPRESSOR

(71) Applicant: KABUSHIKI KAISHA TOYOTA JIDOSHOKKI, Kariya-shi, Aichi-ken (JP)

(72) Inventors: Atsushi Naito, Kariya (JP); Yoshiki Nagata, Kariya (JP); Fumihiro Kagawa, Kariya (JP); Shunsuke Ambo, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 168 days.

(21) Appl. No.: 15/194,726

(22) Filed: Jun. 28, 2016

(65) Prior Publication Data

US 2017/0012506 A1    Jan. 12, 2017

(30) Foreign Application Priority Data

Jul. 7, 2015    (JP) ................................. 2015-136542
Oct. 26, 2015  (JP) ................................. 2015-210259

(51) Int. Cl.
*H02K 11/00*    (2016.01)
*H02K 11/02*    (2016.01)
(Continued)

(52) U.S. Cl.
CPC ............. *H02K 11/02* (2013.01); *H02K 11/33* (2016.01); *H02M 1/14* (2013.01); *H02M 3/155* (2013.01); *H02M 7/5387* (2013.01)

(58) Field of Classification Search
CPC ........ H02K 11/33; H02K 11/02; H02K 11/04; H02K 11/30; H02K 11/024
(Continued)

(56) References Cited

U.S. PATENT DOCUMENTS 5,306,974 A * 4/1994 Bates ................... H02K 11/026
                                                        310/220
5,726,611 A    3/1998 Takagi et al.
(Continued)

FOREIGN PATENT DOCUMENTS

CN    1523755 A    8/2004
CN    101589541 A    11/2009
(Continued)

OTHER PUBLICATIONS

Communication dated Aug. 7, 2017 from the Korean Intellectual Property Office in counterpart Korean application No. 10-2016-0084562.
(Continued)

*Primary Examiner* — Thanh Lam
(74) *Attorney, Agent, or Firm* — Sughrue Mion, PLLC

(57) ABSTRACT

A vehicle inverter device is configured to convert DC power to AC power. The vehicle inverter device includes a circuit having switching elements and a noise reducer. The noise reducer is provided on an input side of the circuit and is configured to reduce common mode noise and normal mode noise contained in the DC power. The noise reducer is configured by a common mode choke coil, which includes a core, a first winding wound about a first winding portion of the core, and a second winding wound about a second winding portion of the core.

12 Claims, 6 Drawing Sheets

(51) Int. Cl.
*H02K 11/33* (2016.01)
*H02M 1/14* (2006.01)
*H02M 7/5387* (2007.01)
*H02M 3/155* (2006.01)

(58) Field of Classification Search
USPC .................................. 310/51, 68 D, 68 R, 72
See application file for complete search history.

(56) References Cited

U.S. PATENT DOCUMENTS

| | | | |
|---|---|---|---|
| 6,037,686 A * | 3/2000 | Schonauer | H01F 37/00 |
| | | | 310/68 R |
| 6,104,110 A * | 8/2000 | Uchida | H02K 11/026 |
| | | | 310/239 |
| 2002/0140301 A1 * | 10/2002 | Kershaw | H02K 11/026 |
| | | | 310/68 R |
| 2008/0048507 A1 * | 2/2008 | Kanda | H02K 5/148 |
| | | | 310/420 |
| 2010/0014988 A1 | 1/2010 | Tsutsui et al. | |
| 2010/0172764 A1 | 7/2010 | Nakano et al. | |
| 2013/0049918 A1 | 2/2013 | Fu et al. | |
| 2014/0063673 A1 | 3/2014 | Kagawa et al. | |
| 2014/0076434 A1 | 3/2014 | Fukasaku et al. | |
| 2014/0097928 A1 | 4/2014 | Tomonari et al. | |
| 2014/0306788 A1 | 10/2014 | Umetani | |
| 2015/0115766 A1 * | 4/2015 | Taguchi | B22F 1/02 |
| | | | 310/216.001 |

FOREIGN PATENT DOCUMENTS

| | | |
|---|---|---|
| JP | 4-355906 A | 12/1992 |
| JP | H04-355905 A | 12/1992 |
| JP | 3003067 B2 | 1/2000 |
| JP | 2005-340670 A | 12/2005 |
| JP | 5039515 B2 | 10/2012 |
| JP | 2014-50141 A | 3/2014 |
| JP | 2014-58910 A | 4/2014 |
| JP | 2014207373 A | 10/2014 |
| KR | 1020140073715 A | 6/2014 |

OTHER PUBLICATIONS

Communication dated Mar. 29, 2018, from the State Intellectual Property Office of the P.R.C in counterpart application No. 201610509527.6.

Communication dated May 8, 2018 issued by the Japanese Patent Office in counterpart application No. 2015-210259.

* cited by examiner

VEHICLE INVERTER DEVICE AND MOTOR-DRIVEN COMPRESSOR

BACKGROUND OF THE INVENTION

The present invention relates to a vehicle inverter device and a motor-driven compressor.

Conventionally, vehicle inverter devices have been known that include switching elements and convert DC power to AC power (for example, refer to Japanese Patent No. 5039515). Such a vehicle inverter device is, for example, used to drive the electric motor of a motor-driven compressor mounted in a vehicle, as disclosed in the above publication.

DC power to be converted by the vehicle inverter device may be contaminated by both of common mode noise and normal mode noise. These noises may hinder normal power conversion by the vehicle inverter device. Nonetheless, the size of the vehicle inverter device is preferably prevented from being increased since it is mounted in a vehicle.

SUMMARY OF THE INVENTION

Accordingly, it is an objective of the present invention to provide a vehicle inverter device that is configured to reduce common mode noise and normal mode noise contained in DC power and a motor-driven compressor including the vehicle inverter device.

To achieve the foregoing objective and in accordance with a first aspect of the present invention, a vehicle inverter device configured to convert DC power to AC power is provided. The vehicle inverter device includes a circuit configured by a plurality of switching elements and a noise reducer, which is provided on an input side of the circuit and is configured to reduce common mode noise and normal mode noise contained in the DC power. The noise reducer is configured by a common mode choke coil, which includes a core, a first winding wound about a first winding portion of the core, and a second winding wound about a second winding portion of the core. DC power in which the common mode noise and the normal mode noise have been reduced by the common mode choke coil is input to the circuit.

To achieve the foregoing objective and in accordance with a second aspect of the present invention, a vehicle inverter device is provided, which is configured to share a vehicle mounted electric storage device with a predetermined vehicle mounted device. The vehicle inverter device is configured to convert DC power supplied from the vehicle mounted electric storage device into AC power that drives an electric motor provided in a motor-driven compressor for use in a vehicle. The vehicle inverter device includes an LC filter, which reduces an inflowing ripple component contained in the DC power, and a conversion circuit, which converts the DC power, in which the inflowing ripple component has been reduced by the LC filter, into the AC power. The conversion circuit has a plurality of switching elements, which are subjected to PWM control. The LC filter is a low-pass filter circuit. A resonance frequency of the LC filter is set to be higher than a noise frequency band, which includes a frequency fluctuation range of the inflowing ripple component. A frequency of a carrier signal used to perform the PWM control of the switching elements is set to be higher than a cutoff frequency of the LC filter.

To achieve the foregoing objective and in accordance with a third aspect of the present invention, a motor-driven compressor is provided. The compressor has an electric motor and the vehicle inverter device according to the first or second aspect. An output side of the circuit is connected to the electric motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle inverter device 30 and a motor-driven compressor 10 according to one embodiment will now be described. The vehicle inverter device 30 is mounted in the motor-driven compressor 10. The motor-driven compressor 10 of the present embodiment is mounted in a vehicle and used for a vehicle air conditioner 100. That is, the motor-driven compressor 10 of the present embodiment is for use in a vehicle. Hereinafter, the outline of the vehicle air conditioner 100 and the motor-driven compressor 10 will be described first. Then, the vehicle inverter device 30 will be described.

Figure 1:
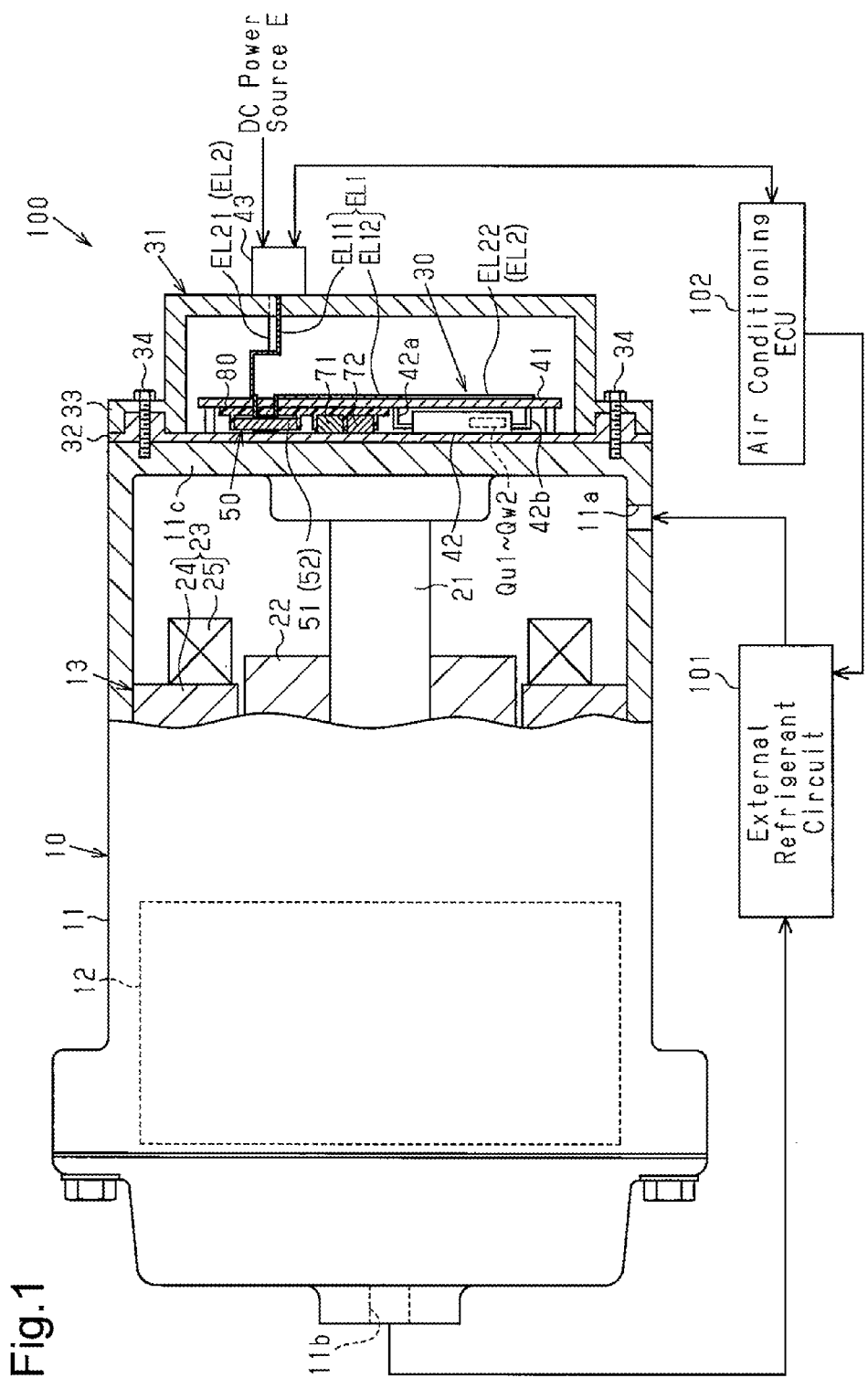
FIG. 1 is a diagram, with a part cut away, schematically illustrating a vehicle inverter device, a motor-driven compressor, and a vehicle air conditioner.

As shown in FIG. 1, the vehicle air conditioner 100 includes the motor-driven compressor 10 and an external refrigerant circuit 101, which supplies refrigerant, which is a fluid, to the motor-driven compressor 10. The external refrigerant circuit 101 includes, for example, a heat exchanger and an expansion valve. The motor-driven compressor 10 compresses the refrigerant, and the external refrigerant circuit 101 performs heat exchange of the refrigerant and expands the refrigerant. This allows the vehicle air conditioner 100 to cool or warm the passenger compartment.

The vehicle air conditioner 100 includes an air conditioning ECU 102, which controls the entire vehicle air conditioner 100. The air conditioning ECU 102 is configured to obtain parameters such as the temperature of the passenger compartment and a target temperature of the vehicle air conditioner 100. Based on the parameters, the air conditioning ECU 102 outputs various commands such as an ON-OFF command to the motor-driven compressor 10.

The motor-driven compressor 10 includes a housing 11, a compression portion 12, and an electric motor 13. The housing 11 has an inlet 11a, into which refrigerant from the external refrigerant circuit 101 is drawn. The compression portion 12 and the electric motor 13 are accommodated in the housing 11.

The housing 11 is substantially cylindrical as a whole and made of a thermally conductive material (a metal such as aluminum). The housing 11 has an outlet 11b through which refrigerant is discharged. The housing 11 is grounded to the body of the vehicle.

When a rotary shaft 21, which will be discussed below, rotates, the compression portion 12 compresses refrigerant that has been drawn into the housing 11 through the inlet 11a and discharges the compressed refrigerant through the outlet 11b. The compression portion 12 may be any type such as a scroll type, a piston type, and a vane type.

The electric motor 13 drives the compression portion 12. The electric motor 13 includes a rotary shaft 21, which is rotationally supported, for example, by the housing 11, a cylindrical rotor 22, which is fixed to the rotary shaft 21, and a stator 23 fixed to the housing 11. The axis of the rotary shaft 21 coincides with the axis of the cylindrical housing 11. The stator 23 includes a cylindrical stator core 24 and coils 25 wound about the teeth of the stator core 24. The rotor 22 and the stator 23 face each other in the radial direction of the rotary shaft 21. When the coils 25 are supplied with currents, the rotor 22 and the rotary shaft 21 rotate. Accordingly, the compression portion 12 compresses refrigerant. The drive current of the electric motor 13 is higher than the current of control signals and is, for example, higher than or equal to 10 A and preferably higher than or equal to 20 A.

As shown in FIG. 1, the motor-driven compressor 10 includes the vehicle inverter device 30, which is configured to drive the electric motor 13, and an inverter case 31, which accommodates the vehicle inverter device 30.

The inverter case 31 is made of a thermally conductive material (for example, a metal such as aluminum). The inverter case 31 includes a base member 32 and a cylindrical cover member 33. The base member 32 contacts the housing 11. Specifically, the base member 32 contacts a wall portion 11c, which is one of the wall portions on the opposite sides in the axial direction of the housing 11 and is located on the side opposite from the outlet 11b. The cover member 33 has a closed end and is assembled to the base member 32. The base member 32 and the cover member 33 are fixed to the housing 11 with bolts 34, which serve as fasteners. Accordingly, the inverter case 31 and the vehicle inverter device 30, which is accommodated in the inverter case 31, are attached to the housing 11. That is, the vehicle inverter device 30 of the present embodiment is integrated with the motor-driven compressor 10.

Since the inverter case 31 and the housing 11 contact each other, these are thermally coupled to each other. The vehicle inverter device 30 is arranged at a position where the inverter device 30 is thermally coupled to the housing 11. No communication hole connecting the space inside the inverter case 31 with the space inside the housing 11 is provided, so that refrigerant does not directly flow into the inverter case 31.

The wall portion 11c of the housing 11, to which the inverter case 31 is attached, is arranged on the opposite side of the electric motor 13 from the compression portion 12. In this respect, it can be said that the inverter case 31 is arranged on the opposite side of the electric motor 13 from the compression portion 12. The compression portion 12, the electric motor 13, and the vehicle inverter device 30 are arranged along the axis of the rotary shaft 21. That is, the motor-driven compressor 10 of the present embodiment is a so-called inline type.

The vehicle inverter device 30 includes, for example, a circuit board 41 fixed to the base member 32, and a power module 42 mounted on the circuit board 41. The output side of the power module 42 is electrically connected to the coils 25 of the electric motor 13 via hermetic terminals (not shown) provided in the wall portion 11c. The power module 42 includes switching element Qu1, Qu2, Qv1, Qv2, Qw1, Qw2 (hereinafter, also simply referred to as switching elements Qu1 to Qw2). In the present embodiment, the power module 42 corresponds to "a circuit that is configured by a plurality of switching elements" and "a conversion circuit."

A connector 43 is provided on the inverter case 31 (specifically, the cover member 33). The inverter device 30 receives DC power from a DC power source E, which is mounted in the vehicle, via the connector 43. The air conditioning ECU 102 and the vehicle inverter device 30 are electrically connected to each other. The vehicle has a power supply capacitor C0, which is connected in parallel with the DC power source E. The power supply capacitor C0 is, for example, an electrolytic capacitor.

The vehicle inverter device 30 includes two wires EL1, EL2, which electrically connect the connector 43 with the input side of the power module 42. The first wire EL1 is connected to the positive terminal of the DC power source E via the connector 43 and to a first module input terminal 42a, which is a first input terminal of the power module 42. The second wire EL2 is connected to the negative terminal of the DC power source E via the connector 43 and to a second module input terminal 42b, which is a second input terminal of the power module 42. In a state in which DC power is being supplied to the power module 42 via the two wires EL1, EL2, the switching elements Qu1 to Qw2 are periodically turned on and off, so that the vehicle inverter device 30 converts the DC power into AC power and delivers the AC power to the coils 25 of the electric motor 13. This drives the electric motor 13.

The current (in other words, the power) handled by the vehicle inverter device 30 has a magnitude sufficient for driving the electric motor 13 and is greater than the current (in other words, the power) of control signals. For example, the current handled by the vehicle inverter device 30 is greater than or equal to 10 A, and preferably greater than or equal to 20 A. The DC power source E is, for example, a vehicle mounted electric storage device such as a rechargeable battery or a capacitor.

The DC power transmitted to the power module 42 from the connector 43, specifically, the DC power transmitted through the wires EL1, EL2 may be contain common mode noise and normal mode noise.

The common mode noise refers to a noise generated when currents flow in the same direction in both of the wires EL1, EL2. The common mode noise may be generated, for example, when the vehicle inverter device 30 (in other words, the motor-driven compressor 10) and the DC power source E are electrically connected to each other via paths other than the wires EL1, EL2 (for example, the body of the vehicle). The normal mode noise refers to a noise that has a certain frequency superimposed on the DC power and is generated when currents flow in the opposite directions in the wires EL1 and EL2 instantaneously. The normal mode noise may also be referred to as an inflowing ripple component contained in the DC power flowing into the vehicle inverter device 30. The details of the normal mode noise will be discussed below.

For this, the vehicle inverter device 30 of the present embodiment includes a noise reducer 50, which is configured to reduce the common mode noise and the normal mode noise contained in the DC power transmitted to the power module 42 from the connector 43. The noise reducer 50 is provided on the wires EL1, EL2, so that the DC power from the connector 43 is supplied to the power module 42 via the noise reducer 50.

The noise reducer 50 will now be described.

Figure 2:
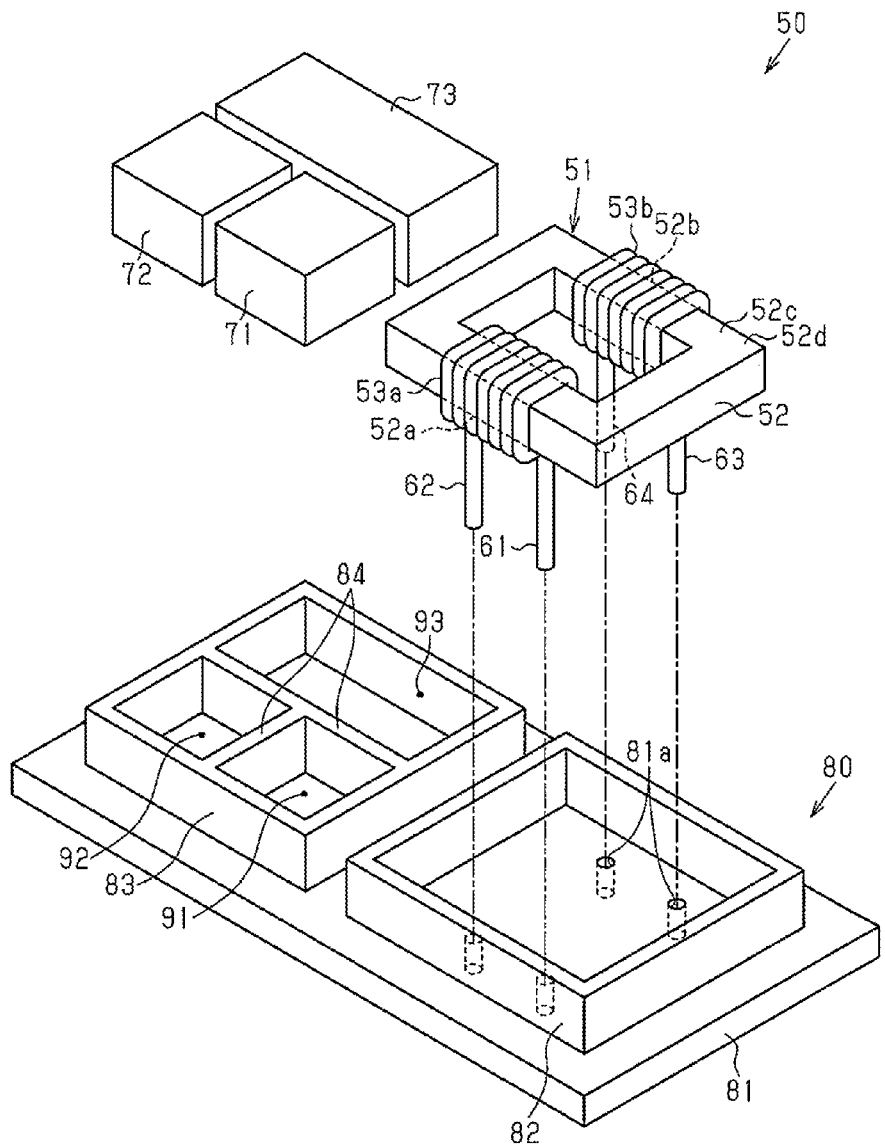
FIG. 2 is an exploded perspective view schematically illustrating the structure of a noise reducer.
Figure 3:
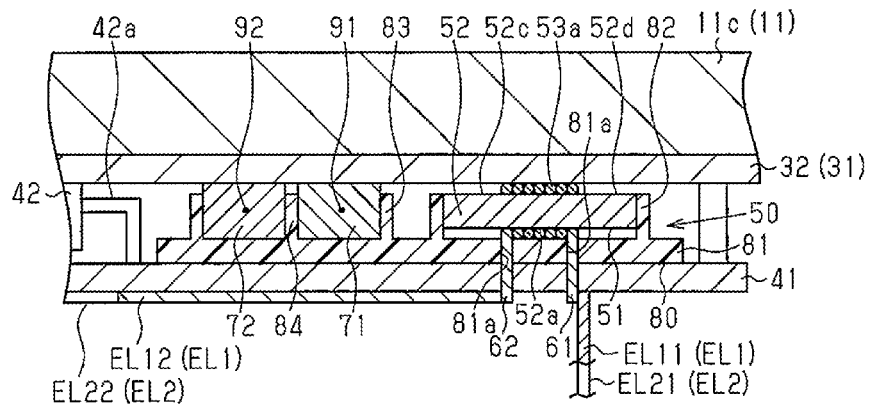
FIG. 3 is a cross-sectional view schematically illustrating the structure of the noise reducer.
Figure 4:
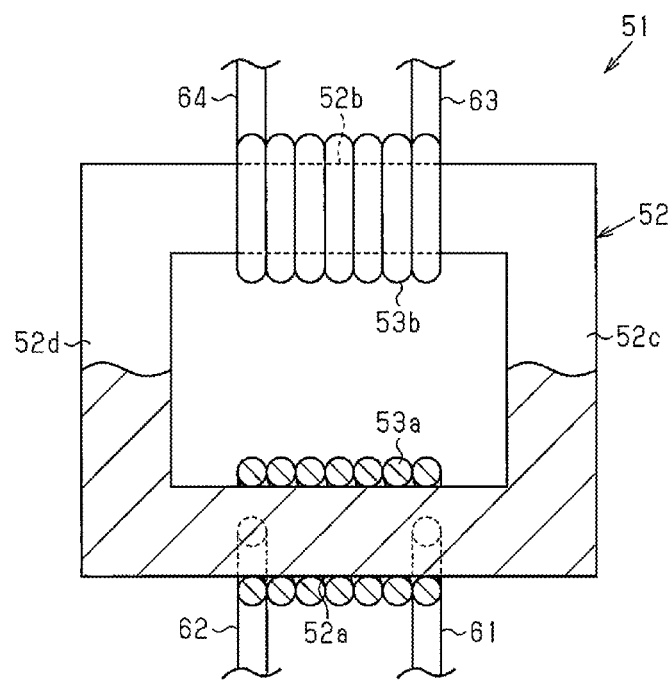
FIG. 4 is a diagram, with a part cut away, illustrating a common mode choke coil.

As shown in FIGS. 2 to 4, the noise reducer 50 includes, for example, a common mode choke coil 51. The common mode choke coil 51 includes a core 52, a first winding 53*a* and a second winding 53*b*. The windings 53*a*, 53*b* are wound about the core 52.

The core 52 has a polygonal loop structure (a rectangular loop structure in the present embodiment). As shown in FIGS. 2 and 4, the core 52 has a first winding portion 52*a*, about which the first winding 53*a* is wound, a second winding portion 52*b*, about which the second winding 53*b* is wound, and exposed portions 52*d*, about which neither of the windings 53*a*, 53*b* is wound and in which a surface 52*c* of the core 52 is exposed. The windings 53*a*, 53*b* are arranged to face each other with the winding axes agreeing with each other. That is, the windings 53*a*, 53*b* are arranged to be parallel with each other. In the present embodiment, the windings 53*a*, 53*b* have the same number of turns.

In the present embodiment, the core 52 is configured by a single component. However, the core 52 may be configured by coupling two symmetrical components together or by combining three or more components.

As shown in FIG. 2, the common mode choke coil 51 includes a first input terminal 61 and a first output terminal 62, which are drawn from the first winding 53*a*. The common mode choke coil 51 also includes a second input terminal 63 and a second output terminal 64, which are drawn from the second winding 53*b*.

Figure 5:
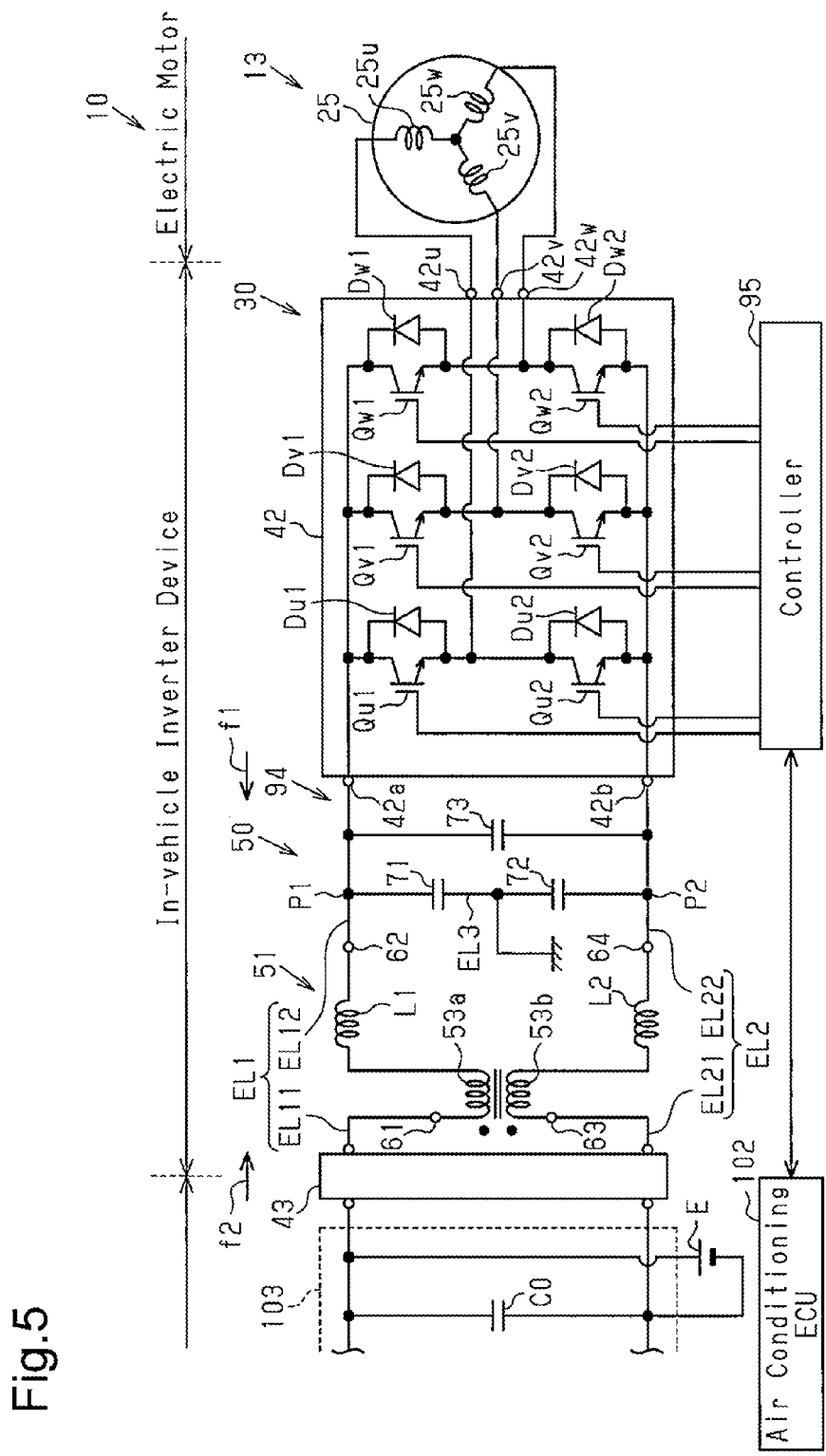
FIG. 5 is an equivalent circuit diagram showing the electrical configuration of the vehicle inverter device.

As shown in FIGS. 3 and 5, the first wire EL1 is used to connect the positive terminal of the DC power source E to the power module 42. The first wire EL1 includes a first connector wire EL11, which connects the connector 43 to the first input terminal 61, and a first module wire EL12, which connects the first output terminal 62 to the first module input terminal 42*a*.

The second wire EL2 is used to connect the negative terminal of the DC power source E to the power module 42. The second wire EL2 includes a second connector wire EL21, which connects the connector 43 to the second input terminal 63, and a second module wire EL22, which connects the second output terminal 64 to the second module input terminal 42*b*. Accordingly, the DC power of the DC power source E is input to the power module 42 via the connector wires EL11, EL21, the windings 53*a*, 53*b*, and the module wires EL12, EL22 in that order. That is, the module wires EL12, EL22 connect the output side of the common mode choke coil 51 to the input side of the power module 42. In this case, it can be said that the windings 53*a*, 53*b* are located on the wires EL1, EL2. The terminals 61, 62 may be referred to as the ends of the first winding 53*a*, and the terminals 63, 64 may be referred to as the ends of the second winding 53*b*.

The common mode choke coil 51 is configured such that, when common mode currents flow through the wires EL1, EL2, the impedance (specifically, the inductance) is relatively great, and that when normal mode currents flow through the wires EL1, EL2, the impedance is relatively small. More specifically, the windings 53*a*, 53*b* are wound such that, when common mode currents, which flow in the same direction, flow through the wires EL1, EL2 (in other words, the windings 53*a*, 53*b*), mutually intensifying magnetic fluxes are generated, and that, when normal mode currents, which flow in the opposite directions, flow through the wires EL1, EL2, mutually cancelling magnetic fluxes are generated.

Since the core 52 has the exposed portions 52*d*, magnetic flux leakage occurs in the common mode choke coil 51 when normal mode currents are flowing through the wires EL1, EL2. That is, the common mode choke coil 51 has a certain inductance in relation to normal mode currents.

As shown in FIGS. 2 and 3, the noise reducer 50 includes bypass capacitors 71, 72 for reducing common mode noise and a smoothing capacitor 73, which is provided separately from the bypass capacitors 71, 72. The smoothing capacitor 73 is, for example, a film capacitor. The electrical connections among these components will be discussed below.

In the present embodiment, the vehicle inverter device 30 includes a mounting member 80, on which the common mode choke coil 51, the bypass capacitors 71, 72, and the smoothing capacitor 73 are mounted. The mounting member 80 includes, for example, a plate-shaped mounting base 81, a first frame 82, and a second frame 83. The frames 82, 83 project upright from one surface of the mounting base 81. The mounting base 81 is, for example, fixed to the circuit board 41.

The first frame 82 has a shape in correspondence with the shape of the core 52. Specifically, the first frame 82 is a rectangular frame slightly larger than the core 52. The common mode choke coil 51 is fit and accommodated in the first frame 82.

The second frame 83 is substantially rectangular as a whole. The second frame 83 has partitions 84 in it. The partitions 84 divide the interior of the second frame 83 into three accommodating spaces 91 to 93. The accommodating spaces 91 to 93 have shapes in correspondence with the shapes of the capacitors 71 to 73. Each of the capacitors 71 to 73 is accommodated in the corresponding one of the accommodating spaces 91 to 93. Accordingly, the common mode choke coil 51 and the capacitors 71 to 73 are made into a unit (a module). In other words, the common mode choke coil 51 and the capacitors 71 to 73 are unitized into the mounting member 80.

As shown in FIG. 2, the mounting base 81 has through-holes 81*a*, into which the terminals 61 to 64 can be inserted. The terminals 61, 62, 63, 64 are inserted into the through-holes 81*a* and respectively connected to the corresponding wires EL11, EL12, EL21, EL22. Although not illustrated, each of the capacitors 71 to 73 has terminals, which are inserted in through-holes in the mounting member 80 and connected to wires.

The common mode choke coil 51 is farther from the power module 42 than the capacitors 71 to 73. Specifically, each of the capacitors 71 to 73 is arranged between the common mode choke coil 51 and the power module 42.

The windings 53*a*, 53*b* and the capacitors 71 to 73 are thermally coupled to the wall portion 11*c* of the housing 11. Specifically, the windings 53*a*, 53*b* and the capacitors 71 to 73 contact the base member 32, which contact the wall portion 11*c* of the housing 11. The heat generated in the windings 53*a*, 53*b* and the capacitors 71 to 73 is transferred to the base member 32 and the wall portion 11*c* and absorbed by the refrigerant in the housing 11.

Next, with reference to FIG. 5, the electrical connection of the noise reducer 50 will be described together with the electrical configuration of the vehicle inverter device 30.

As has been described, the noise reducer 50 is arranged on the input side of the power module 42 (specifically, the switching elements Qu1 to Qw2). Specifically, the common mode choke coil 51 of the noise reducer 50 is located between the connector wires EL11, EL21 and the module wires EL12, EL22.

When normal mode currents flow, the common mode choke coil 51 generates magnetic flux leakage. In this respect, the common mode choke coil 51 can be regarded as having virtual normal mode coils L1, L2 separately from the windings 53a, 53b as shown in FIG. 5. That is, when regarded as an equivalent circuit, the common mode choke coil 51 of the present embodiment includes both of the windings 53a, 53b and the virtual normal mode coils L1, L2. The virtual normal mode coils L1, L2 and the windings 53a, 53b are connected in series.

The bypass capacitors 71, 72 are connected in series. Specifically, the noise reducer 50 includes a bypass wire EL3, which connects one end, or the first end, of the first bypass capacitor 71 to one end, or the first end, of the second bypass capacitor 72. The bypass wire EL3 is grounded to the body of the vehicle.

The serial connection body of the bypass capacitors 71, 72 is connected in parallel with the common mode choke coil 51. Specifically, the other end, or the second end opposite from the first end, of the first bypass capacitor 71 is connected to the first module wire EL12, which connects the first winding 53a (the first output terminal 62) to the power module 42 (the first module input terminal 42a). The other end, or the second end opposite from the first end, of the second bypass capacitor 72 is connected to the second module wire EL22, which connects the second winding 53b (the second output terminal 64) to the power module 42 (the second module input terminal 42b).

The smoothing capacitor 73 is located on the output side of the common mode choke coil 51 and on the input side of the power module 42. Specifically, the smoothing capacitor 73 is provided between and connected in parallel with the power module 42 and the serial connection body of the bypass capacitors 71, 72. Specifically, one end, or the first end, of the smoothing capacitor 73 is connected to a section of the first module wire EL12 between the power module 42 and a connecting point P1 connected to the first bypass capacitor 71. The other end, or the second end, of the smoothing capacitor 73 is connected to a section of the second module wire EL22 between the power module 42 and a connecting point P2 connected to the second bypass capacitor 72.

In this configuration, the common mode choke coil 51 and the smoothing capacitor 73 configure a low-pass filter circuit 94. In other words, the smoothing capacitor 73 cooperates with the common mode choke coil 51 to configure the low-pass filter circuit 94. The low-pass filter circuit 94 reduces the normal mode noise. The low-pass filter circuit 94 can be regarded as an LC filter.

As shown in FIG. 5, the coils 25 of the electric motor 13 are of a three-phase structure, for example, with a u-phase coil 25u, a v-phase coil 25v, and a w-phase coil 25w. The coils 25u to 25w are connected in a Y-connection.

The power module 42 includes u-phase switching elements Qu1, Qu2 corresponding to the u-phase coil 25u, v-phase switching elements Qv1, Qv2 corresponding to the v-phase coil 25v, and w-phase switching elements Qw1, Qw2 corresponding to the w-phase coil 25w. Each of the switching elements Qu1 to Qw2 is, for example, a power switching element such as an IGBT. The switching elements Qu1 to Qw2 include freewheeling diodes (body diodes) Du1 to Dw2.

The u-phase power switching elements Qu1, Qu2 are connected to each other in series by a connection wire that is connected to the u-phase coil 25u via a u-phase output terminal 42u. The serial connection body of the u-phase power switching elements Qu1, Qu2 receives the DC power from the DC power source E. Specifically, the collector of the first u-phase switching element Qu1 is connected to the first module input terminal 42a and is connected to the first module wire EL12 via the first module input terminal 42a. The emitter of the second u-phase switching element Qu2 is connected to the second module input terminal 42b and is connected to the second module wire EL22 via the second module input terminal 42b.

Except for the connected coil, the other switching elements Qv1, Qv2, Qw1, Qw2 have the same connection structure as the u-phase power switching elements Qu1, Qu2. In this case, the switching elements Qu1 to Qw2 can be regarded as being connected to the module wires EL12, EL22.

The connection wire that connects the v-phase switching elements Qv1, Qv2 in series is connected to the v-phase coil 25v via a v-phase module output terminal 42v, and the connecting wire that connects the w-phase switching elements Qw1, Qw2 in series is connected to the w-phase coil 25w via a w-phase module output terminal 42w. That is, the module output terminals 42u to 42w of the power module 42 are connected to the electric motor 13.

The vehicle inverter device 30 includes a controller 95, which controls the power module 42 (specifically, switching of the switching elements Qu1 to Qw2). The controller 95 is electrically connected to the air conditioning ECU 102 via the connector 43. Based on commands from the air conditioning ECU 102, the controller 95 periodically turning the switching elements Qu1 to Qw2 on and off.

Specifically, based on commands from the air conditioning ECU 102, the controller 95 is configured to perform the pulse width modulation control (PWM control) on the vehicle inverter device 30 (specifically, the switching elements Qu1 to Qw2). More specifically, the controller 95 uses a first carrier signal (carrier signal) and a first commanded voltage value signal (signal for comparison) to generate a first control signal. The controller 95 executes ON-OFF control of the switching elements Qu1 to Qw2 by using the generated first control signal, thereby converting DC power to AC power. The frequency of the first carrier signal is a first carrier frequency f1. That is, the first carrier frequency f1 is the frequency of the carrier signal used for the PWM control of the switching elements Qu1 to Qw2.

Figure 6:
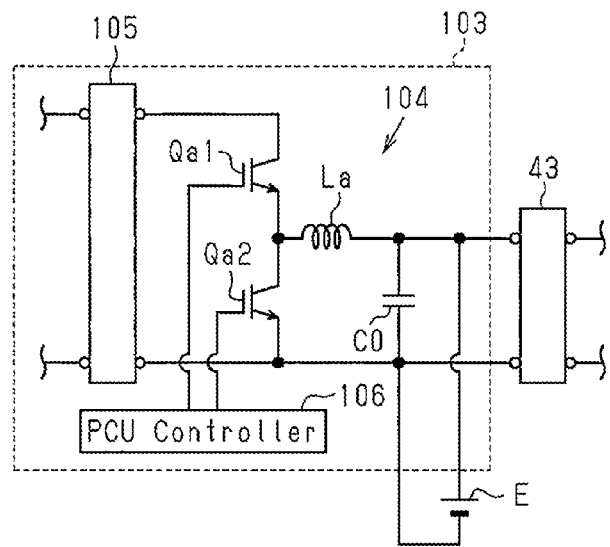
FIG. 6 is a circuit diagram showing a part of the electrical configuration of a power control unit (PCU)

As shown in FIGS. 5 and 6, in addition to the vehicle inverter device 30, the vehicle has a power control unit (PCU) 103 as an example of a vehicle mounted device. The PCU 103 uses the DC power from the DC power source to drive the vehicle driving motor. That is, in the present embodiment, the PCU 103 and the vehicle inverter device 30 are connected in parallel with the DC power source E. The DC power source E is shared by the PCU 103 and the vehicle inverter device 30.

The PCU 103 includes a boost converter 104 and a vehicle-driving inverter 105. The boost converter 104 is configured to raise, for example, the voltage of the DC power of the DC power source E. The vehicle-driving inverter 105 converts the DC power, the voltage of which has been raised by the boost converter 104, to driving power capable of driving the vehicle-driving motor. As shown in FIG. 6, the boost converter 104 has a plurality of (specifically, two) boost switching elements Qa1, Qa2, the power supply capacitor C0, and a boost choke coil La. The boost switching elements Qa1, Qa2 are configured, for example, by IGBTs and connected in series with each other. One end of the boost choke coil La is connected to the positive terminal of the DC power source E, and the other end of the boost choke coil La is connected to the connection wire that connects the boost switching elements Qa1 and Qa2 to each other. The negative terminal of the DC power source E is connected to the emitter terminal of the second boost switching element Qa2. The collector terminal of the first boost switching element Qa1 and the emitter terminal of the second boost switching element Qa2 are connected to the vehicle-driving inverter 105.

The PCU 103 also includes a PCU controller 106, which controls the boost switching elements Qa1, Qa2. The PCU controller 106 performs pulse width modulation control (PWM control) on the boost switching elements Qa1, Qa2, thereby outputting DC power of a desired voltage value to the vehicle-driving inverter 105. Specifically, the PCU controller 106 uses a second carrier signal (carrier signal) and a second commanded voltage value signal (signal for comparison) to generate a second control signal. The PCU controller 106 uses the generated second control signal to execute ON-OFF control of the boost switching elements Qa1, Qa2, thereby converting the DC power of the DC power source E to DC power of a desired voltage value (specifically, the voltage value suitable for driving the vehicle-driving motor). In this configuration, the frequency of the second carrier signal, which is used in the PWM control of the boost switching elements Qa1, Qa2, is a second carrier frequency f2.

The normal mode noise is generated due to switching of the boost switching elements Qa1, Qa2 and includes a noise component of the same frequency as the second carrier frequency f2. The second carrier frequency f2 varies depending on the vehicle type. Therefore, the frequency of the normal mode noise varies according to the vehicle type.

In this configuration, a frequency band including an assumed frequency fluctuation range of the normal mode noise is defined as a noise frequency band Bn. The noise frequency band Bn is set in correspondence with the second carrier frequency f2, which is assumed to fluctuate and is set to include at least the assumed fluctuation range of the second carrier frequency f2. In the present embodiment, the noise frequency band Bn ranges from the assumed minimum value to the assumed maximum value of the second carrier frequency f2. The noise frequency band Bn is, for example, from 2 kHz to 12 kHz. Considering the fact that the normal mode noise is an inflowing ripple component of the DC power input to the vehicle inverter device 30, the noise frequency band Bn can be regarded as a frequency band including the fluctuation range of the frequency of the inflowing ripple component, which varies depending on the vehicle type.

The fluctuation range of the second carrier frequency f2 (in other words, the noise frequency band Bn) may be any range as long as it is set by assuming various vehicle types of different values of the second carrier frequency f2. The specific types and the number of the assumed vehicle types can be set in advance by taking the practicality into consideration. In other words, the noise frequency band Bn may be any frequency band as long as it is set to include the frequency range of several values of the second carrier frequency f2 in a case in which various vehicle types of different values of the second carrier frequency f2 are assumed in advance. The specific vehicle types assumed in advance are appropriately set while taking the practicality into consideration.

Since the normal mode noise is generated due to switching of the boost switching elements Qa1, Qa2, the assumed frequency fluctuation range of the normal mode noise includes at least the assumed fluctuation range of the second carrier frequency f2.

The resonance frequency f3 of the low-pass filter circuit 94 is set to be higher than the noise frequency band Bn. Specifically, the capacitance of the smoothing capacitor 73 is set in correspondence with the magnetic flux leakage of the common mode choke coil 51 (in other words, the inductance of the virtual normal mode coils L1, L2) so that the resonance frequency f3 is higher than the noise frequency band Bn.

The capacitance of the smoothing capacitor 73 is set to be lower than the capacitance of the power supply capacitor C0, so that the normal mode noise is absorbed by the power supply capacitor C0. Specifically, the magnitude of the normal mode noise flowing into the vehicle inverter device 30 (specifically, the low-pass filter circuit 94) fluctuates in correspondence with the ratio between the capacitance of the smoothing capacitor 73 and the capacitance of the power supply capacitor C0. Specifically, the lower the capacitance of the smoothing capacitor 73 in relation to the capacitance of the power supply capacitor C0, the more likely that the inflowing normal mode noise is reduced. In this respect, the capacitance of the smoothing capacitor 73 of the present embodiment is set to be lower than the capacitance of the power supply capacitor C0, so that the normal mode noise of the noise frequency band Bn is attenuated by an amount greater than or equal to a predetermined threshold ratio (for example, −3 dB).

Further, the first carrier frequency f1, which is the frequency of the first carrier signal used in the PWM control of the switching elements Qu1 to Qw2, is set to be higher than a cutoff frequency fc of the low-pass filter circuit 94.

Although not illustrated for ease of explanation, the wires EL1, EL2 each have a certain resistance and a certain inductance, which slightly affect the frequency characteristics of the low-pass filter circuit 94.

Operation of the present embodiment will now be described.

The noise reducer 50 reduces, or absorbs, the common mode noise and the normal mode noise contained in the wires EL1, EL2. Specifically, when common mode currents flow through the wires EL1, EL2, mutually intensifying magnetic fluxes are generated in the windings 53a, 53b. Thus, the common mode choke coil 51 has a relatively high inductance in relation to the common mode currents. Therefore, the common mode choke coil 51 and the bypass capacitors 71, 72 reduce the common mode noise.

Also, when normal mode currents flow through the wires EL1, EL2, mutually cancelling magnetic fluxes are generated in the windings 53a, 53b. In this case, the magnetic fluxes generated in the windings 53a, 53b do not cancel each other completely and leak to the outside. Due to the leaking magnetic fluxes, the common mode choke coil 51 has a certain inductance for normal mode currents. This reduces the normal mode noise. The DC power, in which the common mode noise and the normal mode noise have been reduced by the common mode choke coil 51, is input to the power module 42 via the module wires EL12, EL22.

The inductance of the common mode choke coil 51 for normal mode currents is lower than the inductance of the common mode choke coil 51 for common mode currents. Thus, the loss of the DC power transmitted by the wires EL1, EL2 is relatively small.

Next, the frequency characteristics of the low-pass filter circuit 94 will be described with reference to FIGS. 7 and 8.

Figure 7:
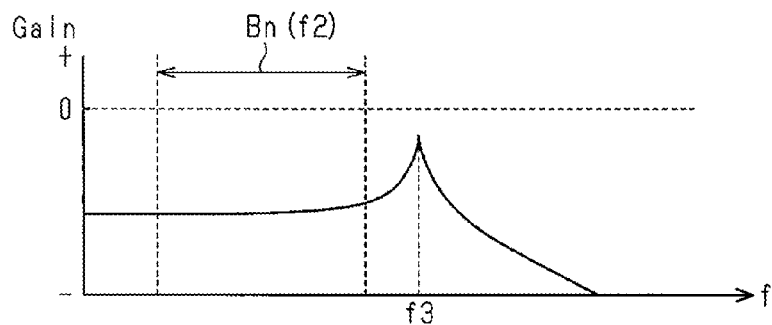
FIG. 7 is a graph showing the frequency characteristics of a low-pass filter circuit in relation to normal mode noise.

As shown in FIG. 7, the resonance frequency f3 of the low-pass filter circuit 94 is set to be higher than the noise frequency band Bn. Specifically, the resonance frequency f3 is set to be higher than the highest frequency in the noise frequency band Bn. The capacitance of the smoothing capacitor 73 is set to be sufficiently lower than the capacitance of the power supply capacitor C0. Therefore, even if the second carrier frequency f2 varies depending on the vehicle type, the normal mode noise flowing into the vehicle inverter device 30 is reduced.

Figure 8:
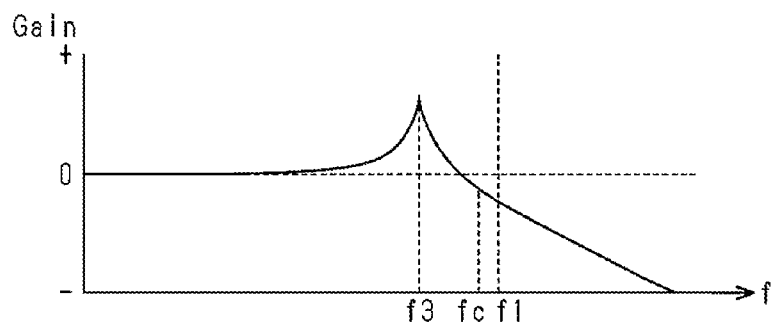
FIG. 8 is a graph showing the frequency characteristics of the low-pass filter circuit in relation to ripple noise generated in the power module.

Also, as shown in FIG. 8, the first carrier frequency f1 is set to be higher than the cutoff frequency fc of the low-pass filter circuit 94. Thus, the noise caused by switching of the switching elements Qu1 to Qw2, specifically, the ripple noise of the first carrier frequency f1 and the ripple noise of the harmonic content of the first carrier frequency f1 are absorbed by the low-pass filter circuit 94. Therefore, the ripple noise generated in the power module 42 is restrained from flowing out from the vehicle inverter device 30.

The present embodiment, which has been described, has the following advantages.

(1) The vehicle inverter device 30, which converts DC power to AC power, includes the power module 42 and the noise reducer 50. The power module 42 is configured by the switching elements Qu1 to Qw2. The noise reducer 50 is provided on the input side of the power module 42 and is configured to reduce the common mode noise and the normal mode noise contained in the DC power. The noise reducer 50 includes the common mode choke coil 51, which has the core 52, the first winding 53a wound about the first winding portion 52a of the core 52, and the second winding 53b wound about the second winding portion 52b of the core 52. The vehicle inverter device 30 is configured such that DC power, in which the common mode noise and the normal mode noise have been reduced by the common mode choke coil 51, is input to the power module 42. Specifically, the vehicle inverter device 30 includes the module wires EL12, EL22, which connect the common mode choke coil 51 to the power module 42.

With this configuration, the common mode noise contained in the DC power, which is subjected to conversion by the vehicle inverter device 30, is reduced by the common mode choke coil 51. When normal mode currents flow, the common mode choke coil 51 generates magnetic flux leakage. This reduces the normal mode noise. Therefore, without providing a dedicated coil for reducing the normal mode noise, DC power, in which both of the common mode noise and the normal mode noise have been reduced, is input to the power module 42. This restrains the size of the vehicle inverter device 30 from being increased.

Specifically, if the DC power, which is subjected to conversion by the vehicle inverter device 30, contains common mode noise or normal mode noise, adverse effects may be brought about. That is, the vehicle inverter device 30 may fail to perform normal power conversion, and unnecessary electromagnetic waves may be generated by the noises. Particularly, since the power that is normally handled by the vehicle inverter device 30 is greater than the power of the control signals, such adverse effects are likely to be conspicuous.

For example, a noise reducer may be employed that includes a coil for reducing common mode noise and another coil for reducing normal mode noise. In this case, however, the size of the noise reducer may be increased due to multiple coils. Particularly, since the power that is handled by the vehicle inverter device 30 is greater than the power of the control signals, the two coils must withstand a relatively great power and thus may have large sizes.

In contrast, the noise reducer 50 of the present embodiment employs the common mode choke coil 51. The common mode choke coil 51 is capable of reducing both of the common mode noise and the normal mode noise. This allows the common mode choke coil 51 and the power module 42 to be directly connected to each other using the module wires EL12, EL22, without providing a coil for normal mode noise. Therefore, it is possible to reduce the common mode noise and the normal mode noise contained in the DC power, which is subjected to conversion by the vehicle inverter device 30, while restraining the size of the noise reducer 50 from being increased.

(2) If a coil for normal mode noise and a coil for common mode noise are both provided, each coil generates heat. The noise reducer 50 thus would generate a great amount of heat as a whole. Particularly, since the power handled by the vehicle inverter device 30 is great, the amount of generated heat tends to be large.

In this regard, having no coil for normal mode noise, the present embodiment reduces the amount of generated heat. This restrains heat generation by the noise reducer 50. Thus, the heat generation by the vehicle inverter device 30, which handles a large amount of power, is restrained in favorable manner.

(3) The vehicle air conditioner 100 includes the vehicle inverter device 30 and the motor-driven compressor 10 for use in a vehicle, which has the electric motor 13. The vehicle inverter device 30 is also used to drive the electric motor 13 of the motor-driven compressor 10 for use in a vehicle. Specifically, the output side of the power module 42 is connected to the electric motor 13. The electric motor 13 generally requires a large amount of AC power to drive. Thus, the vehicle inverter device 30, which drives the electric motor 13, needs to convert a relatively large amount of DC power to AC power. A coil for normal mode noise applicable to such a large amount of DC power tends to be large. The noise reducer 50 tends to be large, accordingly.

In this regard, the present embodiment employs the vehicle inverter device 30, which includes the noise reducer 50 and drives the electric motor 13. Accordingly, the present embodiment is capable of driving the motor-driven compressor 10, while restraining size increase of the vehicle inverter device 30 and reducing noise.

(4) The vehicle inverter device 30 is integrated with the motor-driven compressor 10. Specifically, the motor-driven compressor 10 includes the housing 11 and the inverter case 31. The housing 11 accommodates the compression portion 12 and the electric motor 13. The inverter case 31 accommodates the vehicle inverter device 30 and is attached to the wall portion 11c of the housing 11, which is arranged on the opposite side of the electric motor 13 from the compression portion 12. The compression portion 12, the electric motor 13, and the vehicle inverter device 30 are arranged along the axis of the rotary shaft 21. This restrains the size of the motor-driven compressor 10 from increasing in the radial direction of the rotary shaft 21.

Compared to a so-called camel back type motor-driven compressor, in which a vehicle inverter device 30 is arranged outward of a housing 11 in the radial direction of a rotary shaft 21, the installment space for the vehicle inverter device 30 of the present embodiment tends to be limited. Thus, the installment space for the noise reducer 50 is hard to provide. In contrast, since the present embodiment has no coil for normal mode noise, the noise reducer 50 can be reduced in size. This allows the noise reducer 50 to be installed in a relatively small space. Accordingly, the noise reducer 50 can be relatively easily installed in the motor-driven compressor 10, which is a so-called inline type in which the compression portion 12, the electric motor 13, and the vehicle inverter device 30 are arranged along the axis of the rotary shaft 21.

(5) The noise reducer 50 includes the smoothing capacitor 73, which cooperates with the common mode choke coil 51 to configure the low-pass filter circuit 94. The smoothing capacitor 73 is located on the output side of the common mode choke coil 51 and on the input side of the power module 42. Specifically, the vehicle inverter device 30 includes the first module wire EL12, which connects the first output terminal 62 of the first winding 53a to the first module input terminal 42a of the power module 42. The vehicle inverter device 30 also includes the second module wire EL22, which connects the second output terminal 64 of the second winding 53b to the second module input terminal 42b of the power module 42. The smoothing capacitor 73 is connected to both of the module wires EL12, EL22.

In this configuration, the frequency of the normal mode noise varies depending on the vehicle type. In this case, the resonance frequency f3 of the low-pass filter circuit 94 is set to be higher than the noise frequency band Bn, which includes the assumed frequency fluctuation range of the normal mode noise. Specifically, the capacitance of the smoothing capacitor 73 is set in correspondence with the magnetic flux leakage of the common mode choke coil 51 (in other words, the inductance of the virtual normal mode coils L1, L2) so that the resonance frequency f3 is higher than the noise frequency band Bn. Further, the capacitance of the smoothing capacitor 73 is set to be lower than the capacitance of the power supply capacitor C0, which is connected in parallel with the DC power source E, so that the normal mode noise of the noise frequency band Bn is attenuated by an amount greater than or equal to a predetermined threshold ratio. Thus, even if the frequency of the normal mode noise varies depending on the vehicle type, excessively great normal mode noise is restrained from flowing into the vehicle inverter device 30. This expands application of the invention.

Normally, when the vehicle inverter device 30 is mounted in a vehicle, compatibility verification must be performed to determine whether the vehicle inverter device 30 can be used in the vehicle. In the compatibility verification, it is checked whether the second carrier frequency f2 is equal to the resonance frequency f3 of the low-pass filter circuit 94 or a value that is so close to the resonance frequency f3 that there will be adverse effects. When the second carrier frequency f2 is the same as or close to the resonance frequency f3 of the low-pass filter circuit 94, resonance phenomena occurs. In this case, the normal mode noise that flows into the vehicle inverter device 30 is increased, resulting in incompatibility at worst. As has been described above, the second carrier frequency f2 varies depending on the vehicle type. Thus, the compatibility verification is performed for each vehicle type.

In this regard, the resonance frequency f3 of the low-pass filter circuit 94 of the present embodiment is set to be higher than the noise frequency band Bn. This suppresses the occurrence of resonance phenomena in various vehicle types of different frequencies of the normal mode noise. The vehicle inverter device 30 thus can be employed in various vehicle types. This expands application of the invention. Also, since the compatibility verification can be omitted, the installation of the vehicle inverter device 30 in the vehicle is simplified.

If it suffices that the resonance frequency f3 is set to be outside the noise frequency band Bn, the resonance frequency f3 may be set to be lower than the noise frequency band Bn. Particularly, as discussed below, since the first carrier frequency f1 can be lowered if the resonance frequency f3 is lower than the noise frequency band Bn, the power loss of the power module 42 would be reduced. However, in the present embodiment, the low-pass filter circuit 94 includes the common mode choke coil 51. Although the common mode choke coil 51 can reduce both of the common mode noise and the normal mode noise, the common mode choke coil 51 cannot guarantee a great amount of magnetic flux leakage. Accordingly, the inductances of the virtual normal mode coil L1, L2 tend to be low. Therefore, the resonance frequency f3, which is defined by the magnetic flux leakage of the common mode choke coil 51 and the capacitance of the smoothing capacitor 73, tends to high.

To cope with such a drawback, the capacitance of the smoothing capacitor 73 may be raised to reduce the resonance frequency f3, for example. However, in this case, since the capacitance of the smoothing capacitor 73 approaches the capacitance of the power supply capacitor C0, the power supply capacitor C0 cannot easily absorb the normal mode noise. This increases the normal mode noise flowing into the vehicle inverter device 30.

In contrast, since the resonance frequency f3 is set to be higher than the noise frequency band Bn in the present embodiment, the capacitance of the smoothing capacitor 73 can be set sufficiently lower than the capacitance of the power supply capacitor C0 (specifically, to a level at which the normal mode noise of the noise frequency band Bn is attenuated by an amount greater than or equal to the predetermined threshold ratio). This achieves reduction of both of the normal mode noise and the common mode noise as well as expansion of application of the invention. Further, by using the smoothing capacitor 73, which has a low capacitance, the size of the low-pass filter circuit 94 can be reduced. This reduces the size of the vehicle inverter device 30.

(6) The first carrier frequency f1, which is the frequency of the first carrier signal used in the PWM control of the switching elements Qu1 to Qw2 of the power module 42, is set to be higher than a cutoff frequency fc of the low-pass filter circuit 94. This restrains ripple noise caused by switching of the switching elements Qu1 to Qw2 from flowing out from the vehicle inverter device 30.

Specifically, the first carrier frequency f1 is preferably low if the power loss of the power module 42 is taken into account. However, the present inventors found out that, under a situation where the resonance frequency f3 was set to be higher than the noise frequency band Bn, lowering of the first carrier frequency f1 would cause the ripple noise due to switching of the switching elements Qu1 to Qw2 to flow out of the vehicle inverter device 30 and adversely affect circuits including the PCU 103. Specifically, since the resonance frequency f3 is set to be higher than the noise frequency band Bn, the cutoff frequency fc tends to be high. Under this situation, lowering of the first carrier frequency f1 would cause the first carrier frequency f1 to be lower than the cutoff frequency fc. This prevents the ripple noise from flowing to the smoothing capacitor 73. This may result in a drawback that the ripple noise therefore cannot be absorbed by the low-pass filter circuit 94.

In contrast, the first carrier frequency f1 is set to be higher than the cutoff frequency fc of the low-pass filter circuit 94 as described above in the present embodiment, so that the low-pass filter circuit 94 reduces the ripple noise. This restrains the ripple noise generated in the power module 42 of the vehicle inverter device 30 from flowing out from the vehicle inverter device 30 (in other words, out of the motor-driven compressor 10) without providing a dedicated circuit such as a filter. That is, the low-pass filter circuit 94 functions to reduce the normal mode noise and the common mode noise, which flow into the vehicle inverter device 30, during operation of the PCU 103. The low-pass filter circuit 94 also functions to reduce the ripple noise during operation of the vehicle inverter device 30.

(7) The smoothing capacitor 73 is a film capacitor. This configuration reduces the size of the low-pass filter circuit 94 and improves the durability compared to a configuration in which an electrolytic capacitor is used as the smoothing capacitor 73.

Particularly, film capacitors are more durable than electrolytic capacitors. Also, it is easy to reduce the size and the capacitance of film capacitors. Therefore, when a high capacitance is desired, film capacitors cannot be easily used. However, in the present embodiment, the resonance frequency f3 is set to be higher than the noise frequency band Bn as has been described, allowing the capacitance of the smoothing capacitor 73 to be lowered. Film capacitors are therefore easily used.

Further, film capacitors have better temperature characteristics than electrolytic capacitors. Thus, compared to a case in which an electrolytic capacitor is used as the smoothing capacitor 73, the motor-driven compressor 10 can be smoothly started under cold temperature environments.

(8) The vehicle inverter device 30 shares the DC power source E with the PCU 103, which is a vehicle mounted device. The PCU 103 includes the boost switching elements Qa1, Qa2, which are periodically turned on and off. Thus, the DC power that is input to the vehicle inverter device 30 (specifically, the noise reducer 50) contains normal mode noise that corresponds to the switching frequency of the boost switching elements Qa1, Qa2. Specifically, the normal mode noise contains a noise component of a frequency that is the same as the second carrier frequency f2, which is the frequency of the second carrier signal, which is used to perform the PWM control of the boost switching element Qa1, Qa2. Since the switching frequency of the boost switching element Qa1, Qa2 varies depending on the vehicle type, the frequency of the normal mode noise varies depending on the vehicle type.

In this configuration, the noise frequency band Bn includes the fluctuation range of the switching frequency of the boost switching elements Qa1, Qa2 (that is, the second carrier frequency f2) in a case in which the second carrier frequency f2 is determined by assuming various vehicle types. This allows the vehicle inverter device 30 to be employed in various vehicle types.

(9) The smoothing capacitor 73 and the common mode choke coil 51 are unitized. This allows the size of the noise reducer 50 to be further reduced.

Particularly, the common mode choke coil 51 and the smoothing capacitor 73 are unitized such that the common mode choke coil 51 is farther from the power module 42 than the smoothing capacitor 73. This restrains magnetic flux generated in the common mode choke coil 51 from affecting the power module 42. Accordingly, the switching elements Qu1 to Qw2 are restrained from malfunctioning due to magnetic flux generated in the common mode choke coil 51.

(10) The windings 53a, 53b are thermally coupled to the wall portion 11c of the housing 11. Specifically, the windings 53a, 53b contact the base member 32, which contact the wall portion 11c of the housing 11. This allows the windings 53a, 53b to be cooled by refrigerant, thereby suppressing heat generation at the common mode choke coil 51.

(11) The core 52 has the first winding portion 52a, about which the first winding 53a is wound, the second winding portion 52b, about which the second winding 53b is wound, and the exposed portions 52d, about which neither of the windings 53a, 53b is wound and in which the surface 52c is exposed. Thus, magnetic flux leakage occurs when normal mode currents are flowing through the wires EL1, EL2 (specifically, the windings 53a, 53b). The same advantage as the above item (1) is thus achieved.

The above described embodiment may be modified as follows.

Figure 9:
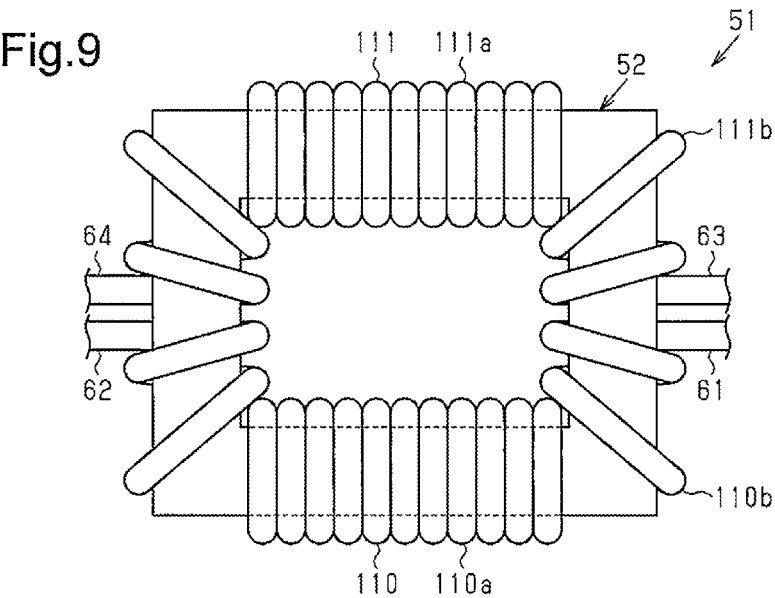
FIG. 9 is a front view schematically illustrating a common mode choke coil according to a modification.

As shown in FIG. 9, windings 110, 111 may be wound about the entire core 52. In this case, the windings 110, 111 may include high density portions 110a 111a and low density portions 110b, 111b, which are different in winding density. The winding density refers to the number of turns of windings per unit length in the axial direction of the windings. Even in this case, magnetic flux leakage occurs in the common mode choke coil 51. Alternatively, only one of the first winding 110 and the second winding 111 may have a high density portion and a low density portion. In this case, both of an exposed portion and a low density portion are provided. In short, it suffices that at least one of the first winding 110 and the second winding 111 has a high density portion and a low density portion.

Figure 10:
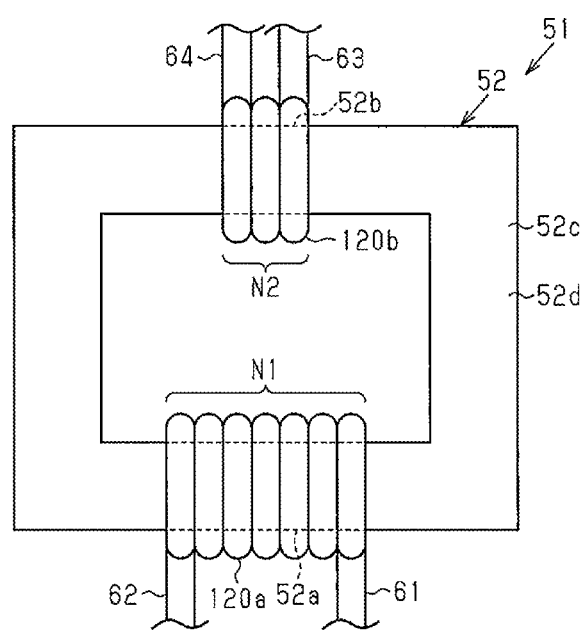
FIG. 10 is a front view schematically illustrating a common mode choke coil according to another modification.

As shown in FIG. 10, a first number of turns N1, which is the number of turns of a first winding 120a, and a second number of turns N2, which is the number of turns of a second winding 120b, may be different from each other. For example, the first number of turns N1 may be greater than the second number of turns N2. In this case, the length of the first winding 120a in the winding axial direction is longer than the length of the second winding 120b in the winding axial direction. Even In this case, magnetic flux leakage generated in the chock coil 51 when normal mode currents flow through the windings 120a, 120b can be increased. However, the numbers of turns N1, N2 are preferably equal to each other since that configuration reduces the common mode noise. Not limited to the above modification, the second number of turns N2 may be greater than the first number of turns N1.

The above described modifications may be used in combination or applied to the above illustrated embodiment as necessary.

The core 52 may have flanges protruding from the surface 52c on both sides in the winding axial direction of the first winding 53a to restrict displacement and loosening of the first winding 53a in the winding axial direction. In this case, the protruding dimension of the flanges is preferably flush with or slightly inward of the outer circumferential surface of the first winding 53a. This prevents the flanges from contacting the base member 32 and thus allows the first winding 53a to contact the base member 32. This modification is applicable to the second winding 53b.

The base member 32 may be omitted. In this case, the windings 53a, 53b preferably directly contact the wall portion 11c of the housing 11.

The shape of the core 52 may be changed. For example, a UU core, an EE core, and a toroidal core may be used.

The motor-driven compressor 10 of the above illustrated embodiment is a so-called inline type. However, a camel back type may be employed, in which a vehicle inverter device 30 is arranged outward of a housing 11 in the radial direction of a rotary shaft 21. In short, the position of the vehicle inverter device 30 may be changed arbitrarily.

In the above illustrated embodiment, the common mode choke coil 51 and the capacitors 71 to 73 are unitized. However, the present invention is not limited to this configuration. For example, the common mode choke coil 51 and the smoothing capacitor 73 may be unitized, and the bypass capacitors 71, 72 may be provided separately. Also, the common mode choke coil 51 and the bypass capacitors 71, 72 may be unitized, and the smoothing capacitor 73 may be provided separately. Further, the common mode choke coil 51, the bypass capacitors 71, 72, and the smoothing capacitor 73 may be provided separately.

The positions of the common mode choke coil 51 and the bypass capacitors 71, 72 may be changed within the inverter case 31.

The module wires EL12, EL22 may be omitted, and the output terminals 62, 64 of the common mode choke coil 51 may be directly connected to the module input terminals 42a, 42b of the power module 42. Also, the smoothing capacitor 73 may be directly connected to the output terminals 62, 64.

In the above illustrated embodiment, the motor-driven compressor 10 is used in the vehicle air conditioner 100. However, the motor-driven compressor 10 may be used in other apparatuses. For example, if a fuel cell is mounted in the vehicle, the motor-driven compressor 10 may be used in an air supplying device that supplies air to the fuel cell. That is, the fluid to be compressed is not limited to refrigerant, but may be any fluid such as air.

The vehicle inverter device 30 may be also used to drive a device other than the electric motor 13 of the motor-driven compressor 10. For example, in a vehicle having at least one of a vehicle-driving motor and a power generating motor, the vehicle inverter device 30 may be used to drive that motor.

The method for controlling the boost switching element Qa1, Qa2 is not limited to the PWM control, but may be changed.

The vehicle mounted device is not limited to the PCU 103, but may be any device that includes switching elements, which are periodically turned on and off. For example, the vehicle mounted device may be an inverter that is separately provided from the vehicle inverter device 30.

The noise reducer 50 may include a coil for reducing common mode noise and another coil for reducing normal mode noise. That is, the noise reducer 50 is not limited to the configuration with the common mode choke coil 51.

The specific circuit configuration of the noise reducer 50 is not limited to the one according to the above illustrated embodiment. For example, the smoothing capacitor 73 may be omitted. Alternatively, two smoothing capacitors 73 may be provided.

An electrolytic capacitor may be employed as the smoothing capacitor 73.

The noise frequency band Bn may be the same as the fluctuation range of the second carrier frequency f2 or may include the fluctuation range of the second carrier frequency f2 and the fluctuation range of the harmonic content of the second carrier frequency f2. For example, the frequency band of the normal mode noise may range from the second carrier frequency f2 to the harmonic of a predetermined order of the second carrier frequency f2. In this case, the noise frequency band Bn may be set to include the frequency band of the normal mode noise corresponding to the minimum value of the assumed second carrier frequency f2 and the frequency band of the normal mode noise corresponding to the maximum value of the assumed second carrier frequency f2. The resonance frequency f3 of the low-pass filter circuit 94 is preferably set to be higher than the noise frequency band Bn. This configuration restrains the normal mode noise in the harmonic content of the second carrier frequency f2 from adversely affecting the vehicle inverter device 30.

Therefore, the present examples and embodiments are to be considered as illustrative and not restrictive and the invention is not to be limited to the details given herein, but may be modified within the scope and equivalence of the appended claims.

The invention claimed is:

1. A vehicle inverter device configured to convert DC power to AC power, comprising:
  a circuit configured by a plurality of switching elements; and
  a noise reducer, which is provided on an input side of the circuit and is configured to reduce common mode noise and normal mode noise contained in the DC power, wherein
  the noise reducer is configured by a common mode choke coil, which includes a core, a first winding wound about a first winding portion of the core, and a second winding wound about a second winding portion of the core, and
  DC power in which the common mode noise and the normal mode noise have been reduced by the common mode choke coil is input to the circuit.

2. A vehicle inverter device according to claim 1, further comprising a smoothing capacitor, which is provided on an output side of the common mode choke coil and an input side of the circuit, wherein
  the smoothing capacitor cooperates with the common mode choke coil to configure a low-pass filter circuit, and
  a frequency of a carrier signal used to perform PWM control of the switching elements is set to be higher than a cutoff frequency of the low-pass filter circuit.

3. The vehicle inverter device according to claim 2, wherein
  a frequency of the normal mode noise varies depending on a vehicle type, and
  a resonance frequency of the low-pass filter circuit is set to be higher than a noise frequency band, which includes an assumed frequency fluctuation range of the normal mode noise.

4. The vehicle inverter device according to claim 3, wherein
  the vehicle inverter device shares a vehicle mounted electric storage device with a vehicle mounted device including a switching element,
  the noise reducer is configured to receive DC power of the vehicle mounted electric storage device,
  a switching frequency of the switching element of the vehicle mounted device varies depending on a vehicle type, and
  the noise frequency band includes an assumed fluctuation range of the switching frequency of the switching element of the vehicle mounted device.

5. The vehicle inverter device according to claim 3, wherein the smoothing capacitor is a film capacitor.

6. The vehicle inverter device according to claim 4, wherein
the vehicle mounted device includes a power supply capacitor, which is connected in parallel with the vehicle mounted electric storage device, and
a capacitance of the smoothing capacitor of the low-pass filter circuit is set in correspondence with magnetic flux leakage of the common mode choke coil so that the resonance frequency of the low-pass filter circuit is higher than the noise frequency band and is set to be lower than a capacitance of the power supply capacitor so that the normal mode noise of the noise frequency band is attenuated by an amount greater than or equal to a predetermined threshold ratio.

7. The vehicle inverter device according to claim 2, wherein the smoothing capacitor and the common mode choke coil are unitized.

8. The vehicle inverter device according to claim 1, wherein the core includes an exposed portion, about which the windings are not wound and in which a surface is exposed.

9. The vehicle inverter device according to claim 1, wherein at least one of the first winding and the second winding includes a high density portion and a low density portion, which are relatively different in the number of turns of windings per unit length in an axial direction of the windings.

10. The vehicle inverter device according to claim 1, wherein the number of turns of the first winding and the number of turns of the second winding are different from each other.

11. A vehicle inverter device, which is configured to share a vehicle mounted electric storage device with a predetermined vehicle mounted device,
wherein the vehicle inverter device is configured to convert DC power supplied from the vehicle mounted electric storage device into AC power that drives an electric motor provided in a motor-driven compressor for use in a vehicle,
the vehicle inverter device comprising:
an LC filter, which reduces an inflowing ripple component contained in the DC power; and
a conversion circuit, which converts the DC power, in which the inflowing ripple component has been reduced by the LC filter, into the AC power, wherein the conversion circuit has a plurality of switching elements, which are subjected to PWM control, wherein
the LC filter is a low-pass filter circuit,
a resonance frequency of the LC filter is set to be higher than a noise frequency band, which includes a frequency fluctuation range of the inflowing ripple component, and
a frequency of a carrier signal used to perform the PWM control of the switching elements is set to be higher than a cutoff frequency of the LC filter.

12. A motor-driven compressor comprising:
a vehicle inverter device configured to convert DC power to AC power; and
a housing, which accommodates an electric motor and a compression portion,
wherein the vehicle inverter device includes
a circuit configured by a plurality of switching elements, wherein an output side of the circuit is connected to the electric motor, and
a noise reducer, which is provided on an input side of the circuit and is configured to reduce common mode noise and normal mode noise contained in the DC power, wherein
the noise reducer is configured by a common mode choke coil, which includes a core, a first winding wound about a first winding portion of the core, and a second winding wound about a second winding portion of the core, and
DC power in which the common mode noise and the normal mode noise have been reduced by the common mode choke coil is input to the circuit.

* * * * *